Dec. 15, 1959 P. C. DAUGERT 2,916,785
WEDGE ANCHORS
Filed Sept. 5, 1956

INVENTOR.
PETER C. DAUGERT
BY William J Fox,
attorney.

United States Patent Office 2,916,785
Patented Dec. 15, 1959

2,916,785
WEDGE ANCHORS
Peter C. Daugert, Wilkes-Barre, Pa.
Application September 5, 1956, Serial No. 608,046
1 Claim. (Cl. 24—136)

This invention relates to wedge anchors for anchoring steel bars or more particularly relates to wedge anchors for anchoring high strength steel bars maintained under high tension in concrete structures, particularly in those structures subject to vibrations and considerable variations in stress.

In the prestressing of concrete structures, such as tanks, beams, bridges, etc., it has long been a problem to devise an anchor that would hold in place the high tensile steel bars used for prestressing the structure. As steel bars were developed to be stressed to greater tensions, the problem of anchoring these bars became more and more acute. In general, the tendency is towards the construction of heavier anchoring devices, especially providing more steel in the anchoring device itself as the tension increased. To anchor such bars, it was the normal practice to provide at a predetermined position on the bar some means for securing it, such as a threaded end, or a widened end known as an "upset" end.

It is an object of this invention to provide a wedge anchor that will be capable of resisting the force to which it is subjected and in effect, which will be capable of withstanding forces greater than the bar which is being anchored can withstand.

It is an object of this invention to provide a wedge anchor that can be placed at any position on the bar.

It is a further object to provide a wedge anchor that will be self-seating for anchoring the non-jacking end of a bar.

In summary, this invention accomplished the objects recited above by providing a one piece steel wedge anchor that is relatively thin with respect to the bar and so designed that its anchoring surface will circumferentially uniformly seat against the bar to be anchored and whose overall formation is such that it will extend with and conform to the bar being tensioned.

High tensile steel bars have been found to be very sensitive to notch action, that is, if a notch is formed in the bar it is prone to break at this point. If the object that formed the notch remains in the notch, under pressure, this action doesn't occur. It is therefore imperative that once the teeth of a wedge have dug into or notched the bar, they must remain in place under pressure or the bar will fail at this point. The teeth might possibly come out of the notch in several ways, such as by the tip of the wedge passing through the plate, by the plate bending and the pressure on critical threads being relieved or by the angle of the plate hole and wedge being such that the pressure is relieved as the wedge goes in.

For prestressing operations the bar is from ¼" to 1½" in diameter and should be able to withstand a tension of at least 100,000 pounds per square inch and very often up to as high as 200,000 pounds per square inch.

In developing the wedge of this invention, one feature found to be of importance, was to have the wedge in one part or if in more than one part, to provide means for maintaining relative position during the seating of the several parts. By so doing, the tendency found in two or multi-part wedges of slippage by one part is avoided. Such slippage of one part of a wedge unit ahead of another can cause bar fracture, undesirable bar notching or wedge failure. However, to make such a wedge so that it would fit over the bar snugly, it is necessary to make it extremely thin in comparison to the bar. This feature of an extremely thin wedge having great holding power is the principal feature of this invention. It has been discovered that such a thin wedge will elongate and shorten more nearly the same as the bar it is holding and thus the tendency for stripping is virtually eliminated. The thin wedge will also conform itself to the irregularities of the bar and thereby increase the gripping area. It also permits one piece construction as mentioned heretofore.

It has been found that the wedge, to accomplish the above, must have a cross-sectional area at its tip that is less than the cross-sectional area of the bar, and preferably should be not greater than the ratio of 1 to 2½. It should have a gentle angle, not more than 15° measured from the longitudinal axis of the wedge, and more preferably 10°, but it will work from 8° to 12°. Below an 8° angle the wedge has a tendency to pull through the plate, materially increase the forward movement of the wedge when seating and severely indent or penetrate the bar, all of which are objectionable. Above 12° the butt end of the wedge is difficult to close around the bar, the wedge is more difficult to seat because of reduced constricting pressure, and there is not sufficient penetration of the bar by the wedge teeth. The ratio of bar diameter to wedge length should be not over 1 to 2, and preferably 1 to 1.5. With these proportions, a wedge will have enough steel to accomplish a gripping action far beyond that of a much heavier wedge.

Another preferred feature is to case harden the wedge to a depth of from .010" to .015" while having the internal body of the wedge of relatively softer material as compared with the bar. The case hardened teeth will grip the bar and the case hardened outer surface of the wedge will not be affected by minor surface irregularities in the wedge plate. The soft and pliable wedge body will thus allow the wedge to flow towards surface indentations on the bar as well as elongate or shorten with the bar.

Further details and advantages of this invention will be apparent from the following detailed description of an embodiment of the principles of this invention and by reference to the appended drawings to which that description refers.

In the drawings, Figure 1 is a sectional elevation of the wedge anchor before being seated by means of a jack assembly.

Figure 1:
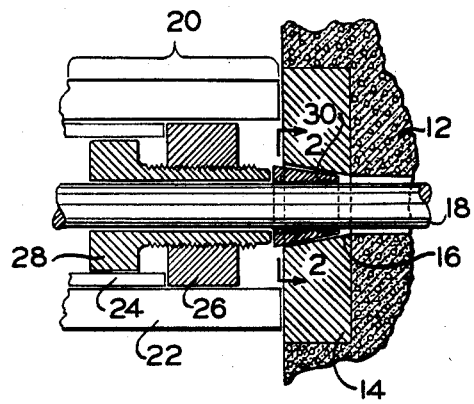
Figure 2:
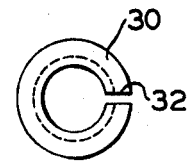
Figure 2 is a view of the large end of the wedge looking from a plane on the line 2—2 in Fig. 1.

More particularly in the drawings, in Fig. 1 the concrete object 12 has inserted therein, in a recess, anchor plate 14 containing tapered bore 16. Mounted in the concrete object and unbonded thereto is prestressing bar 18 made from high strength steel. Although shown in a recess in this figure, the plate need not always be so used, and may be on the surface of the object.

The prestressing bar is tensioned by means of jacking assembly 20, comprising bearing legs 22, nut support 24, threaded nut 26 which may be welded in place, and screw jack 28. The pre-stressing bar 18 is secured to a piston assembly, not shown, in a manner well-known in the art and is elongated and thereby subject to the appropriate desired tension by this piston assembly. After the desired tension is applied to the bar, the screw jack 28 is screwed to drive home wedge 30 to secure the bar in place and to maintain the bar at the desired tension.

As shown, the wedge 30 comprises a circular body of concentric inner and outer surfaces, the inner surface being substantially of uniform diameter throughout while the outer surface tapers at a slight angle from one end of the wedge to the other. The wedge is made of a single piece of steel with a slot 32 through one side and extending completely through the length of the wedge. By providing a wedge so designed that it is in only one piece and extremely thin, rather than in two or more pieces, there is developed a condition in which the wedge may properly take on a shape complementary to that of the bar when it is seated under stress on the bar.

Figure 3:
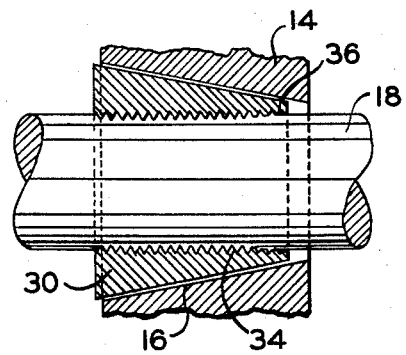
Figure 3 is a sectional detail, on an enlarged scale, showing the wedge in seated position and showing the bar in elevation.

Figure 3 shows the wedge in seated position, anchoring the bar in locked position. The teeth 34 have been forced into the bar 18, actually forming indentions in the bar and providing a non-slip anchorage. Note in this figure that the tip of the wedge, when seated, has not passed through the plate. In this manner, the constant pressure which is exerted against the bar is not released.

A further refinement in the designing of the wedge permits pressure against the bar exerted by the wedge to remain constant along the length of the wedge. This is accomplished by designing the angle of the outside of the wedge and the angle of the hole in the wedge plate so that this pressure is constantly held equal throughout the length of the wedge. A preferred angle for a wedge of this type is a 10° taper. In order to accomplish the constant pressure mentioned above, the wedge itself is constructed with a taper of approximately 10° with all tolerances on the plus side of this angle while the wedge plate is constructed with a taper of approximately 10° with all the tolerances minus. The initial grip of the wedge on the bar takes place at the larger end of the wedge giving a proper locking action by squeezing the bar to a small diameter and penetrating and forming threads on the bar. The portion of the bar not gripped by the wedge at its larger end is left at a larger diameter and prohibited from moving or slipping independent of the wedge.

Figure 4:
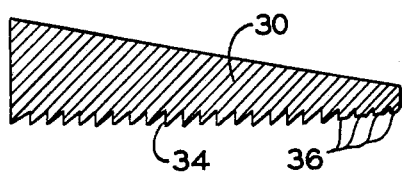
Figure 4 shows a partial sectional view of a further embodiment of the wedge showing buttress threads.

In Figure 4 one end portion of a wedge 30 is shown constructed of buttress threads 34. The angle of these threads is such that the wedge may be slipped on easily but cannot be removed because of the gripping or cutting action of these teeth. The buttress thread also has the advantage of allowing the bar to be retensioned, the wedge advanced over existing bar indentation without scraping or shearing off the tops of the first indentations, or otherwise damaging the bar. This is extremely useful for the non-jacking end of the bar.

In a further modification shown in Figures 3 and 4, the first several teeth 36 of the wedge 30 have the crest of the teeth removed so that a flat gripping is obtained in the nose of the wedge and notching action which might otherwise weaken the bar is reduced.

The opposite or non-jacking end of the bar which must also be seated in the concrete object 12 may also be anchored by this wedge and wedge plate assembly. In seating the wedge on this non-jacking end, the tight-fitting wedge is forced open and freely slipped over the bar. The buttress teeth grip and hold the bar securely. The bar is stressed to five tons per square inch and then relaxed to one-half a ton. In lieu of this manner of seating the wedge on the non-jacking end and in order to avoid such close tolerances on the wedge, a small clamp (not shown) with set grooves may be slipped over the bar to start setting the wedge. When seating on the non-jacking end, the function of the thin feature is substantially the reverse of that on the jacking end. The bar is continuously tensioned on the non-jacking end and the wedge must be able to elongate and move with the bar. At the jacking end, after the wedge is seated, the jack is released and the bar, together with the wedge, has a tendency to contract or shorten.

This application is a continuation-in-part of my application Ser. No. 535,857, filed September 22, 1955, now abandoned.

I claim:

A reinforcing steel bar and anchor assembly for sustaining forces in excess of 100,000 p.s.i., comprising in combination, an anchor plate having a tapered hole extending therethrough, a high strength steel bar extending through and of materially smaller diameter than the hole, a one-piece transversely circular tapered anchor wedge for the bar having a longitudinal slot through the length thereof, the wedge encircling the bar and extending into and engaging the wall of the hole and terminating at its smaller end short of the smaller end of the tapered hole, the wedge having internal teeth of substantially uniform depth through substantially the length of the wedge, the interior portion of said wedge body being ductile steel, and the entire body of said wedge being case hardened to a hardness greater than the bar whereby upon compression of the wedge in the hole the teeth will bite into the bar and the ductile wedge body will deform and move with the bar upon elongation of the latter to prevent relative movement between the wedge teeth and the bar whereby weakening of the bar is prevented.

References Cited in the file of this patent

UNITED STATES PATENTS

| 155,535 | Mason | Sept. 29, 1874 |
| 206,321 | Heaton | July 23, 1878 |
| 269,446 | Moss | Dec. 19, 1882 |
| 1,388,716 | Hughes | Aug. 23, 1921 |
| 1,712,108 | Goeller | May 7, 1929 |
| 2,009,318 | Highfield | July 23, 1935 |
| 2,161,694 | Becker | June 6, 1939 |
| 2,166,457 | Berndt | July 18, 1939 |
| 2,180,866 | Cryer | Nov. 21, 1939 |
| 2,294,398 | Ferguson | Sept. 1, 1942 |
| 2,641,810 | Gasink | June 16, 1953 |